Nov. 15, 1938.  H. R. HOWLAND  2,137,088
VEHICLE WHEEL
Filed May 3, 1938
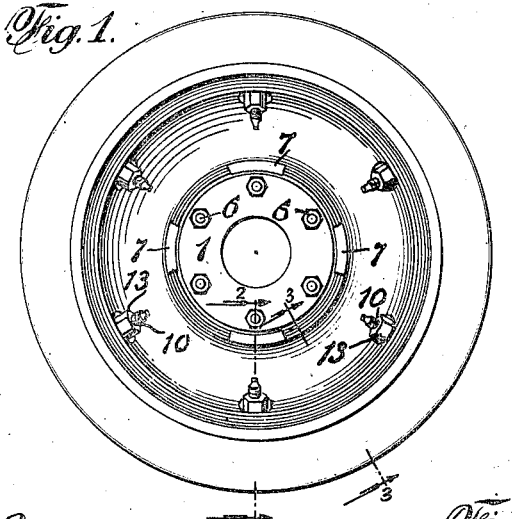
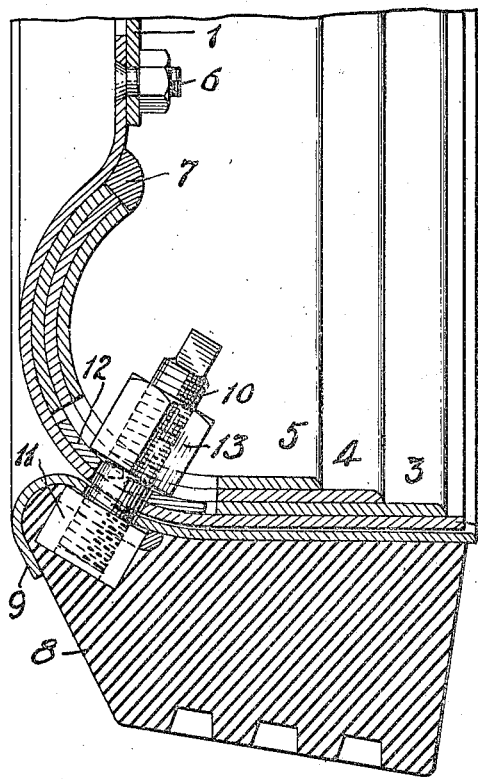
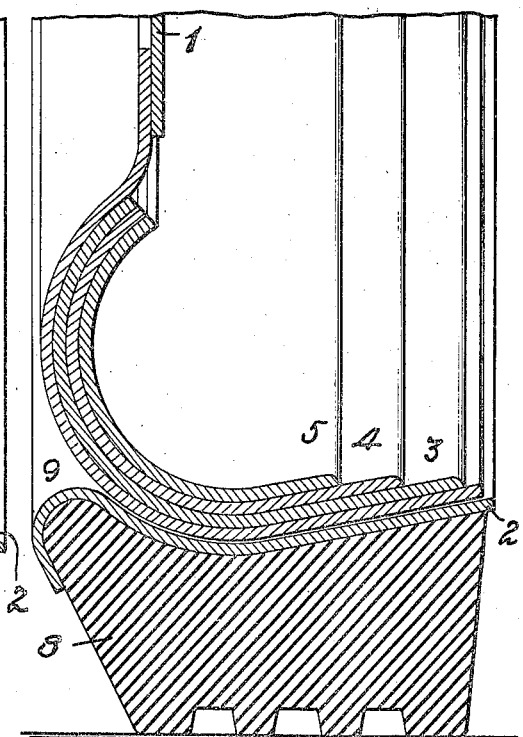
INVENTOR
HENRY R. HOWLAND
BY
Mitchell & Bechert
ATTORNEYS.

Patented Nov. 15, 1938

2,137,088

UNITED STATES PATENT OFFICE 2,137,088

VEHICLE WHEEL

Henry R. Howland, Brooklyn, N. Y.

Application May 3, 1938, Serial No. 205,670

4 Claims. (Cl. 152—29)

This invention relates to vehicle wheels particularly useful for motor vehicles.

Among the main objects are to provide a construction to afford proper predetermined resiliency and that will engage uneven or slippery road surfaces in such a manner as to reduce tendency to skid, and since it permits of the successful use of a tire of solid rubber or the like, it is not open to the objection of being puncturable. These and other advantages will appear to the mechanic skilled in this art from a reading of the following specification and an examination of the accompanying drawing, in which—

Fig. 1 is a side elevation of a wheel embodying my invention and drawn on a small scale and being partly broken away to illustrate certain details;

Fig. 2 is a relatively enlarged sectional view on the line 2—2 of Fig. 1;

Fig. 3 is a relatively enlarged, sectional view, taken on the line 3—3 of Fig. 1 but showing the parts under load.

1 represents a wheel disk having a central aperture to receive a wheel hub and brake drum of any well known construction. The felly of the wheel comprises a plurality of deeply dished rings or annuli 2—3—4—5. These rings are nested together so that the transverse portions as viewed in Figs. 2 and 3 will constitute a yielding and reacting support for the tire proper. The bottom of these rings curve upwardly and inwardly in cross-section as viewed in Figs. 2 and 3. The outer ring 2 is extended to overlie the outer edge of the disk 1 in such a manner that it may be rigidly fastened thereto as by a plurality of bolts 6. The extreme edges of the rings 3—4—5 are united to the ring 2 by any suitable means or method such as welding, welds 7—7 being conventionally shown in Figs. 1 and 2. 8 represents a solid tire of rubber or the like, which is secured in any well known manner to a yielding metallic ring 9, which is adapted to slide over the outermost ring 2, as shown in Figs. 2 and 3. The ring 9 may be secured to the outer ring 2 in any suitable manner, but in this instance I have shown a plurality of equally spaced studs 10 for that purpose. Welded to the inner side of the ring 9 is a nut 11 into which the threaded end of the stud 10 may be screwed. The ring 2 has a passage of sufficient size to permit the stud 10 to be passed therethrough to be engaged with the nut 11. The rings 3—4—5 have enlarged passages which afford ample clearance around the stud 10 to permit a washer 12 to be inserted to bear against the inside of the ring 2. 13 is a nut which is threaded onto the stud 10 so that it may be turned down against the split ring washer 12 to firmly hold the ring 9 to the ring 2. All of the rings are made of spring steel and as viewed in Figs 2 and 3, it will be observed that the several rings 2—3—4—5 are of less width so that said rings will overlap after the manner of a leaf spring. Any conventional mud guard may be applied, if desired, to cover the several stud ends to exclude dirt. Preferably, the threads on the stud which will engage the nut 11 are left-hand, while the threads for the nut 13 are right-hand.

Operation.—In Fig. 2 I have shown in cross-section approximately the predetermined position of the parts when there is no load on the wheel. In Fig. 3 I have shown the position of the parts when load is applied. In the latter position it will be noted that the free edges of the several rings are sprung upwardly and inwardly at a point directly above the area of contact with the road. Under such condition, the opposite sides of these same rings in the position horizontal to the road will spring laterally and outwardly. As road inequalities are encountered, the lower free edges of the several felly rings will act and react in such a manner as to cause the tread of the tire 8 to follow said irregularities so as to properly grip the road to prevent skidding. Heretofore, yielding fellies have been provided, but in such instances the yielding supports act and react only in the plane of rotation of the wheel, whereas in the present case spring action and reaction occurs not only in the plane of the wheel but transversely thereto.

I claim:

1. In a vehicle wheel of the character described, a flexible felly comprising a plurality of deeply dished rings nested together, the outer ring forming a seat for a yielding tire tread, said rings yielding transversely of the plane of rotation of the wheel.

2. In a vehicle wheel of the character described, a flexible felly comprising a plurality of deeply dished rings nested together, the outer ring forming a seat for a yielding tire tread, said rings yielding transversely of the plane of rotation of the wheel, said rings being of successively less width so that each ring will only partially overlie its immediate supporting ring.

3. In a vehicle wheel of the character described, a flexible felly comprising a plurality of deeply dished rings nested together, the outer ring forming a seat for a yielding tire tread, said rings yielding transversely of the plane of rotation of the wheel, a removable tire element comprising a metallic spring ring carrying a flexible tire tread, and said spring ring having a plurality of nuts at its outer side, means for connecting the same to the dished rings comprising studs in threaded engagement with said nuts, and clamping nuts on said studs for engaging the inside of one of said dished rings.

4. In a vehicle wheel of the character described, a flexible felly comprising a plurality of deeply dished rings nested together, the outer ring forming a seat for a yielding tire tread, said rings yielding transversely of the plane of rotation of the wheel, a removable tire element comprising a metallic spring ring carrying a flexible tire tread, said spring ring having a plurality of nuts at its outer side, means for connecting the same to the dished rings comprising studs in threaded engagement with said nut, and clamping nuts on said stud for engaging the outer of said dished rings, the other dished rings having clearance passages of adequate size to permit of the free passage of said nut therethrough.

HENRY R. HOWLAND.